Patented Apr. 14, 1925.

1,533,689

UNITED STATES PATENT OFFICE.

ANSON GARDNER BETTS, OF KINDERHOOK, NEW YORK.

MAKING REFRACTORY ARTICLES AND THE LIKE.

No Drawing.   Application filed September 9, 1922.   Serial No. 587,241.

*To all whom it may concern:*

Be it known that I, ANSON GARDNER BETTS, a citizen of the United States, and a resident of Kinderhook, in the county of Columbia and State of New York, have invented certain new and useful Improvements in Making Refractory Articles and the like, of which the following is a specification.

This invention relates to the manufacture of refractory articles in which solution of aluminum chloride and of other salts which gives the same or even better results from the standpoint of refractoriness is used, and decomposed in the heating of the articles, depositing alumina or other refractory oxide as a bond or filler, this process being described in my United States application for patent, Serial Number 450419, filed March 7th, 1921 "Bonding mineral matter into forms and shapes."

The principal object of the present invention is to effect improvements particularly in the bonding of powdered or granular refractories by the use of aluminum chloride solution. Other important objects may be noted from the following description of my method.

By molding such materials as powdered carborundum, fused alumina, silica, chromite, zirkite, powdered fire-bricks, with solution of aluminum chloride, and then heating to around a red heat, refractory articles and structures are produced, while hydrochloric acid and water vapor are driven off.

In the production of brick, tile, and shapes used in furnace construction, I may improve the density and hardness of the brick etc. by saturating them with solution of aluminum chloride and again heating, which leaves further amounts of alumina in the interstices of the brick etc. This may be repeated several times to get brick of low or very low porosity, but this alumina now constitutes a considerable percentage of the brick and alumina so produced is expensive on account of the cost of materials and handling.

I overcome these objections preferably as follows:

An open cast-iron mold, having preferably an upper cavity, of the size and shape of the brick desired, and a temperature above the condensation temperature of any mixture of hydrochloric acid and water vapors, is filled with a mixture, for example, of crushed and powdered fire-brick made into a thick mud with a strong solution of aluminum chloride. On maintaining and raising the temperature of the mold by suitable means, to say a low red heat, the mold-contents become heated, aluminum chloride decomposes in the presence of the water vapors, leaving the alumina in the brick, while the vapors are driven off. The vapors are retained and condensed to aqueous hydrochloric acid, and the acid is then reconverted into aluminum chloride solution by dissolving therein, or treating therewith, such material as aluminum scrap, aluminum hydrate, or soluble or decomposable aluminous minerals. This precedure enables the use of the hydrochloric acid over and over again, largely cutting down the cost of material for the process.

The economy in manufacturing brick etc., by repeated use of the hydrochloric acid used in making aluminum chloride, makes it more practicable to retreat brick etc., with aluminum chloride in the manner described, for the purpose of making more solid and harder products.

By using a hot iron mold as described, chemical action on the iron is avoided by the heat, and the finishing by heating can be performed without removing the brick from the mold Molds of this kind may be arranged in plurality on turntables, or arranged in a row and be moved as a continuous chain, or otherwise, in ways well-known and widely practiced by engineers, so that the molds progressively receive a filling of the wet mixture, pass under a press for compacting the mud, and over heating appliances for the necessary heating, and under hoods for collecting the vapors for transmission to condensers or absorbers for recovering the hydrochloric acid. Such mechanical arrangements are well-known and are mentioned to show the easy applicability of the process in a way resulting in low-cost production. However the use of a heated iron mold for both forming (and pressing) and the subsequent heat-curing of finished brick is thought constitutes an important improvement in the prior art of making of brick, which consists in molding, removal from the mold and heat-curing, involving the additional manufacturing steps of removing from the mold, putting the bricks through a drying process, and then re-handling to and from kilns.

An important application of my process is in the re-manufacture of brick from old used brick, brick bats and material from furnaces when torn down or rebuilt. Such material can be crushed and remade into superior brick, using well-known methods of eliminating undesirable matter, as slag, during the breaking, crushing and milling. In some respects such material is highly desirable on account of having been previously highly-heated, so that when the material has been manufactured by my process, and the aluminous bond well dehydrated by very moderate heating, as compared with kiln-burning of brick, the product is not one subject to changes during the further heating to the working temperature in the furnaces.

In practicising my invention, I may vary the operations from those described and still obtain the results of the process. For example, the mud of powdered refractory base and aluminum chloride solution, may be pressed, discharged from the molds, passed through heating chambers for curing and recovery of the hydrochloric acid, and if desired wetted with aluminum chloride solution and again heated as many times as desired.

In the claims the term refractory article is used for such articles as bricks, tiles, flue-linings and other non-metallic objects used in the heat-resisting parts of furnaces.

The practical advantages of pressing the damp mix in iron (or other suitable metal) molds, in connection with the use of solution of aluminum chloride as bonding and refractifying agent, are several, as compared to prior methods of making refractory articles and the like.

1. Starting with powdered chrome ore for example, or other refractory material which does not require a high long heat in a kiln to expand it like silica or shrink it like fire-clay, the entire manufacturing process is completed in about a couple of hours with the consumption of a comparatively trifling amount of fuel, and the brick for example, are made if the molds are mechanically operated, without any hand labor at all, giving low cost and continuous production.

2. Brick, etc., so made can be practically mathematically perfect in size and shape, a very desirable thing not now commercially accomplished.

3. There is no requirement for any plastic bonding agent or ingredient like fireclay with the contingent necessity and disadvantage of kiln burning to change the character of such bond.

4. The residual alumina of this process increases the refractibility and density, as well as serving as bonding agent.

5. Refractories and the like can be produced from pulverulent materials without any reference to the plasticity of cohesiveness of the damp or wet mix, as a mix entirely without cohesion or plasticity is supported by the mold until the bonding is effected.

In the operation of mechanical devices having a plurality of mechanically operated molds, the molds do not need to be cooled entirely from the previous heating before taking a new filling of wet mix, thus economizing heat and increasing speed of operation, although the actual process is the same otherwise with a cold mold with the further difference that with metal molds as of gray iron, which are not acid resistant, a certain amount or all of the acid corrosion may be obviated with the warm molds. The consideration of corrosion is not a feature of the process as obviously acid-proof metals such as high-silicon iron may be used for molds.

What I claim as new and desire to secure by Letters Patent, is—

1. Process of making a refractory article which consists in molding comminuted refractory acid-insoluble material with an aqueous aluminum salt, in a metal mold, heating mold and contents driving off volatile matters, forming the contained mix to a solid physically-dry article, and separating the same from the mold.

2. Process of making refractory article which consists in mixing powdered refractory acid insoluble material with an aqueous aluminum salt, molding in a moderately heated metal mold, heating mold and contents expelling volatile matters, converting the contained mix to a solid physically-dry object and separating the same from the mold.

3. Process of making refractory article which consists in mixing powdered acid-insoluble refractory material with an aqueous easily decomposable mineral salt having a highly refractory base and volatile acid forming constituent, molding in a metal mold, heating mold and contents expelling volatile matters, forming contents of mold to a solid physically dry article and removing from the mold.

4. Process of making refractory article which consists in mixing powdered acid-insoluble refractory material with an aqueous aluminum salt of a volatile acid, molding in a metal mold, heating mold and contents expelling volatile matters forming contents of mold to a solid physically-dry article, and removing the same from the mold.

In testimony whereof I have hereunto signed my name.

ANSON GARDNER BETTS.